No. 726,859. PATENTED MAY 5, 1903.
G. J. CAPEWELL.
METAL CUTTING TOOL.
APPLICATION FILED JUNE 4, 1902.
NO MODEL.
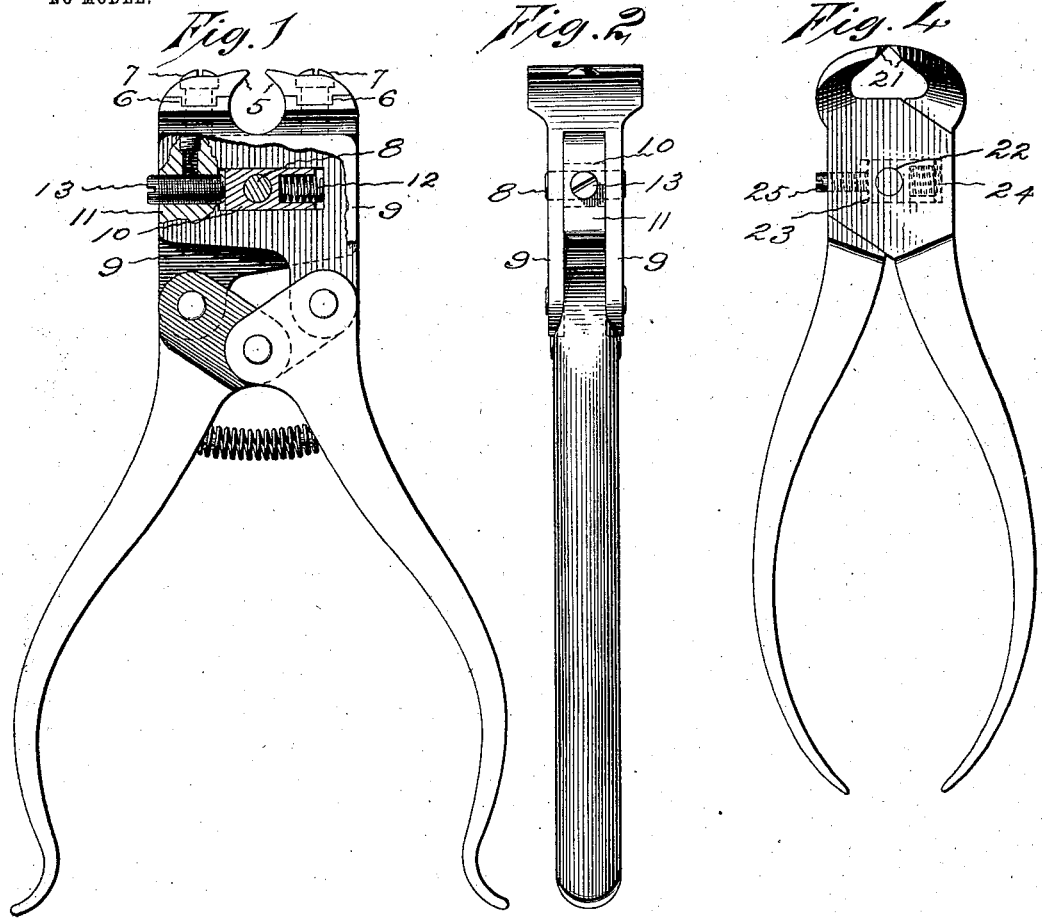
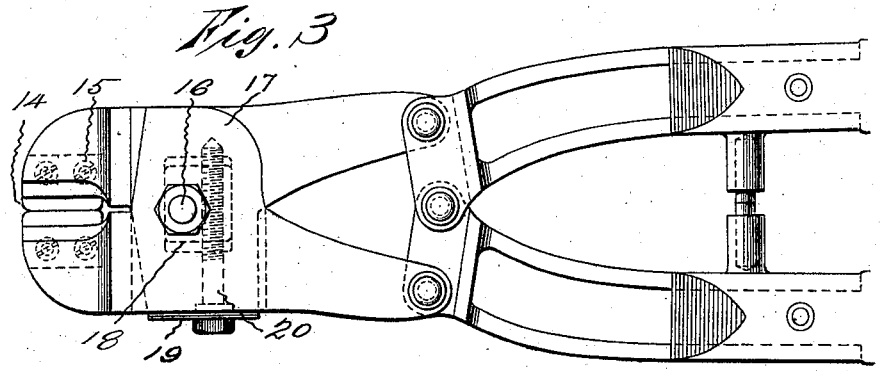
Witnesses:
Inventor:
George J. Capewell
by Harry R. Williams
atty.

No. 726,859.

Patented May 5, 1903.

UNITED STATES PATENT OFFICE.

GEORGE J. CAPEWELL, OF HARTFORD, CONNECTICUT.

METAL-CUTTING TOOL.

SPECIFICATION forming part of Letters Patent No. 726,859, dated May 5, 1903.

Application filed June 4, 1902. Serial No. 110,163. (No model.)

*To all whom it may concern:*

Be it known that I, GEORGE J. CAPEWELL, a citizen of the United States, residing at Hartford, in the county of Hartford and State of Connecticut, have invented certain new and useful Improvements in Metal-Cutting Tools, of which the following is a specification.

This invention relates to those hand-tools which have pivoted jaws with blades for nipping or shearing wire, bolts, sheet metal, and the like.

The object of the invention is to provide a very simple and convenient means for adjusting the jaws, so as to obtain the most efficient action as the blades become worn down or are ground away. This object is attained by holding the jaw-pivot in a block that is movable in one part and providing means for moving that block with the pivot into such position that the blades will come together in the necessary relation to effect the best result.

Figure 1 of the accompanying drawings illustrates the invention as embodied in a pair of toggle-lever nippers, one of the cheek-pieces being broken away to expose the interior. Fig. 2 is an edge view of these nippers. Fig. 3 shows the invention embodied in a bolt cutter or shear, and Fig. 4 shows the invention embodied in a simple lever wire-nipper.

The blades 5 of the form shown in Fig. 1 are removably secured to the ends of the jaw-blocks by tongues and grooves 6 and screws 7. One jaw-block is mortised to receive a tongue on the other jaw-block, and the pivot 8 passes through the cheek-pieces 9 of the mortised jaw-block and a pivot-block 10, that is movable in a mortise in the tongue 11 of the other jaw-block. A spring 12 thrusts between a wall of the mortise and an end of the pivot-block, so as to thrust the pivot-block in one direction, and a set-screw 13 turns in a threaded perforation in the edge of the tongue against the other end of the pivot-block, so as to force it against the spring. The spring holds the pivot-block against the set-screw, and by turning the screw the position of the block with the pivot, and consequently the relation of the jaws, may be adjusted so that the blades will close together to just the degree necessary to effect the cut.

In the form shown in Fig. 3 the blades 14 are secured in recesses in the side faces of the jaw-blocks by screws 15. These jaw-blocks are held together by a pivot 16, that passes through the cheek-pieces 17 of one jaw-block and the movable pivot-block 18 in the mortise in the tongue 19 of the other jaw-block. In this form the block is provided with a threaded perforation, and the screw 20 passes through this perforation, so that the adjustment of the pivot-block is positively effected by turning the screw in one direction or the other.

In the form shown in Fig. 4 the blades 21 are fixed to the jaws, one of which passes through a slot in the other. In this form the jaws are held together by the pivot 22, that passes through the sides of one part, and the block 23, that is movable in a mortise, in the other part. In this case the spring 24 and the screw 25 are arranged for adjusting the block and setting the pivot so that the blades will come together properly.

As shown, this invention is equally applicable for tools having fixed or removable nipping or shearing blades on the ends or sides of the jaws and having toggle-lever handles, as shown in Figs. 1 and 3, or fixed handles, as shown in Fig. 4, and the adjustment may be obtained by the spring and screw, as shown in Figs. 1 and 4, or by the screw alone, as shown in Fig. 3.

Nippers or shears made according to this invention are easily and quickly adjusted, so that the blades will come together to the necessary degree to effect the easiest cut, and this simple adjustment is quite long, so that the blades may be sharpened many times or if broken may be ground away considerably without affecting the efficiency of the tool.

I claim as my invention—

A metal-cutting tool having jaws with cutting-blades, a pivot passing through the sides of one jaw and through a block movable in an opening in the other jaw, a screw holding the block against movement, and a spring pressing the block against the screw, substantially as specified.

GEORGE J. CAPEWELL.

Witnesses:
H. R. WILLIAMS,
V. R. HOLCOMB.